United States Patent [19]

Streit

[11] Patent Number: 4,629,289

[45] Date of Patent: Dec. 16, 1986

[54] ELECTRIC CONTACT ARRANGEMENT FOR LIQUID CRYSTAL DISPLAY CELLS

[75] Inventor: Peter Streit, Widen, Switzerland

[73] Assignee: U.S. Philips Corporation, New York, N.Y.

[21] Appl. No.: 589,316

[22] Filed: Mar. 14, 1984

[30] Foreign Application Priority Data

Mar. 31, 1983 [CH] Switzerland ................. 1792/83

[51] Int. Cl.$^4$ ............................................. G02F 1/13
[52] U.S. Cl. ..................................... 350/336; 350/332
[58] Field of Search ............................. 350/332, 336

[56] References Cited

U.S. PATENT DOCUMENTS

| | | | |
|---|---|---|---|
| 4,025,162 | 5/1977 | Yagi | 350/332 X |
| 4,058,970 | 11/1977 | Ichinose | 350/332 X |
| 4,132,984 | 1/1979 | Gross | 350/336 |
| 4,431,270 | 2/1984 | Funada et al. | 350/332 |
| 4,474,432 | 10/1984 | Takamatsu et al. | 350/332 X |

*Primary Examiner*—John K. Corbin
*Assistant Examiner*—Richard F. Gallivan
*Attorney, Agent, or Firm*—Paul R. Miller

[57] ABSTRACT

An electric contact arrangement for liquid crystal display cells is disclosed which consists of a multi-point connector having an internal embedded integrated circuit. The contact arrangement contains contacts to a liquid crystal display cell, and external terminals to appropriate circuitry. The contact arrangement can be plugged into the side of the liquid crystal display cell in order to remain outside the display or illumination zone. The embedded integrated circuit is located in the immediate vicinity of the contacts from the liquid crystal cell inserted into the multi-point connector. By this means the electrical losses and outlay on the connections are considerably reduced.

11 Claims, 6 Drawing Figures

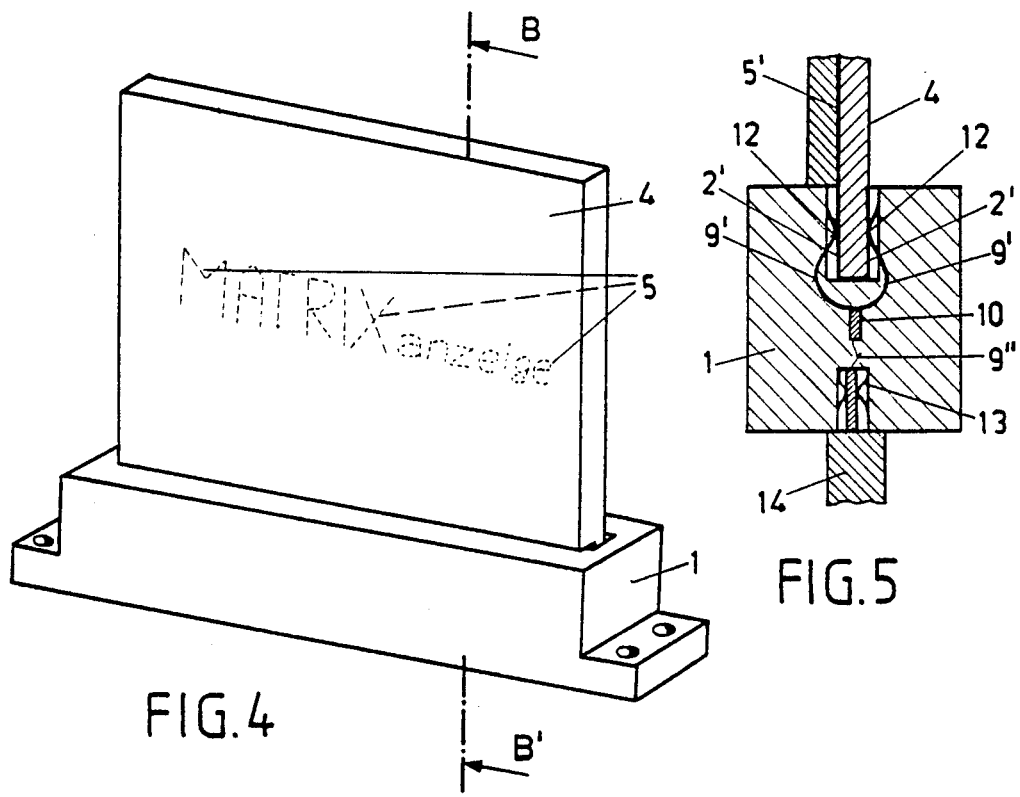
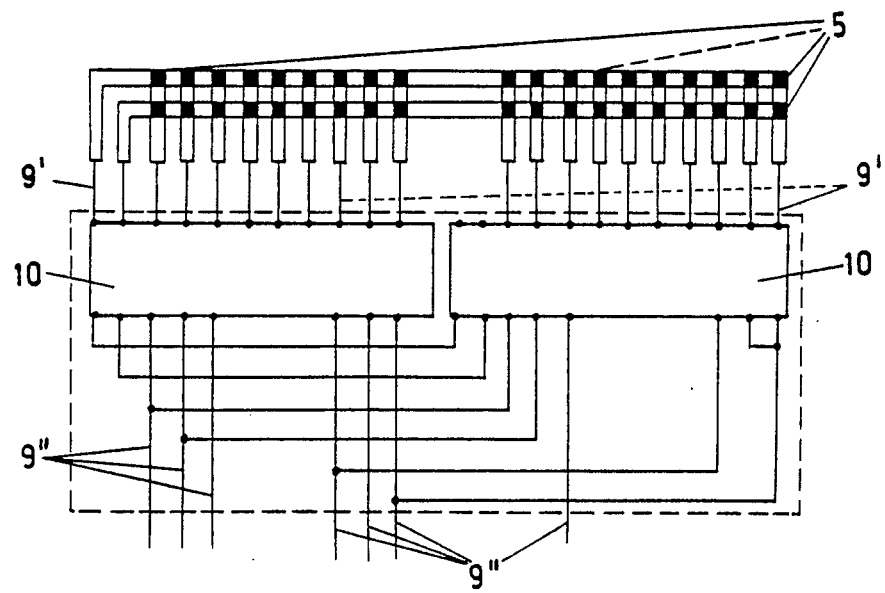

ELECTRIC CONTACT ARRANGEMENT FOR LIQUID CRYSTAL DISPLAY CELLS

BACKGROUND OF THE INVENTION

The invention relates to an electric contact for liquid crystal display cells. The contact arrangement described in German Pat. No. 2,910,779 consists of part mounts comprising a bottom part and side walls, from the upper ends of which two mutually parallel strips (projections) begin which reach over the display device. A display cell representing a single digit is pushed into the clamping seat thus formed. A fluorescence plate can then be provided between the holder bottom and the display cell. In the holder bottom, an integrated electronic circuit is embedded which is electrically connected to the terminal pins protruding from the holder bottom and to the contact pins located in the side walls. The contact pins are curved towards the display cell and, with connection surfaces extending across the end face of the display cell, form a spring-loaded electric contact for the electrodes. If the contact is unsatisfactory, the contact pins can be soldered to the connection surfaces. For the representation of several display symbols, a corresponding number of part holders is connected by means of snap closures.

The known contact arrangement can be exchanged only with great difficulty, even if the contact pins are not soldered to the connection surfaces. The display device to be provided with contacts cannot be operated in transmitted light. With the exception of a fluorescence plate, artificial illumination is difficult. In addition, the number of terminal pins for the representation of many display symbols is considerable. Using this contact arrangement, it is difficult to provide large display cells with contacts.

It is one of the objects of invention to provide an electric contact arrangement for liquid crystal display cells, which is suitable for both transmissive and reflective displays, which can easily be exchanged, and which allows good electrical contacting of the display cell. It is a further object to provide a device which is also suitable for display cells of any desired shape, and which has few external electrical terminals and is of space-saving design.

The advantages obtained by the invention are essentially that the electric contact arrangement, due to the counter-contacts, represents a good and stable electrical connection to the display cell and nevertheless, for example in the event of a malfunction of the integrated circuit, can readily be exchanged. Since the contact arrangement is located outside the display and illumination zone, it is particularly suitable for displays which are operated in transmitted light. Moreover, the outlay on connections, which is otherwise conisderable, using auxiliary prints, part holders and "chip-on-glass" technology is minimised.

BRIEF DESCRIPTION OF THE DRAWINGS

The invention is explained below in more detail by reference to examples illustrated in the drawing in which:

FIG. 4 shows a liquid crystal display cell with another electric contact arrangement according to the invention;

FIG. 5 shows a section of the contact arrangement according to FIG. 4 along the line B—B', and FIG. 6 shows a cascade connection of two integrated circuits.

DESCRIPTION OF THE PREFERRED EMBODIMENT

Figure 1:
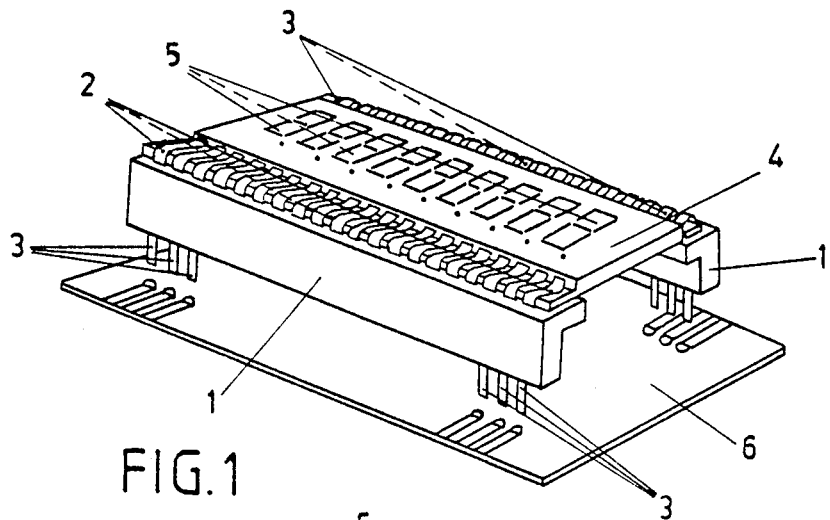
FIG. 1 shows a liquid crystal display cell with an electrical contact arrangement according to the invention.

Two contact arrangements according to the invention with L-shaped multi-point connectors 1 are shown in FIG. 1. The counter-contacts held in the multi-point connector 1 and the external terminals are formed by contact tabs 2 and contact pins 3. The two contact arrangements are plugged into the side of a liquid crystal display cell 4 which has electrode segments 5 for digits and decimal points. The contact arrangement is mounted on a print plate 6 by means of soldering the contact pins 3.

Figure 2:
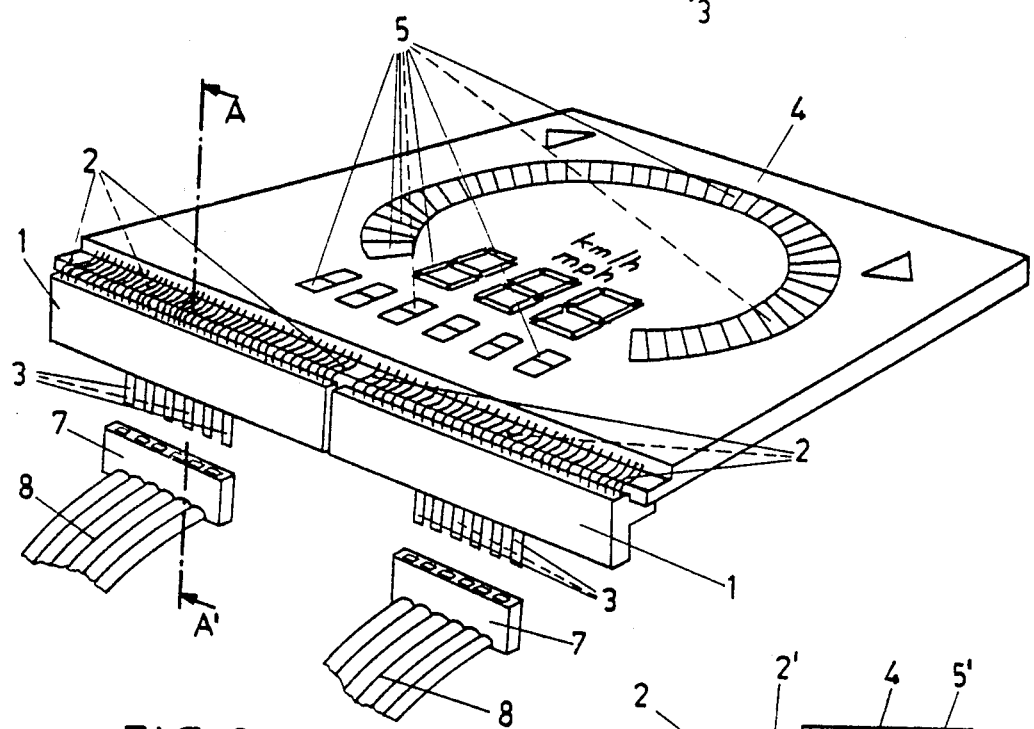
FIG. 2 shows another liquid crystal display cell with another electric contact arrangement according to the invention.

Two further electric contact arrangements according to the invention with L-shaped multi-point connectors 1 are shown in FIG. 2. The designation is here the same as in FIG. 1. In this case, the two contact arrangements are plugged into the same side of a large-area liquid crystal display cell 4. The cell forms a speedometer display for cars, and it has digits and other display symbols. The contact pins 3 are arranged in the center of the multi-point connector 1 and are pushed into a plug 7. The socket in turn is connected via a flat band cable 8 to a voltage supply and control electronics (not shown).

Figure 3:
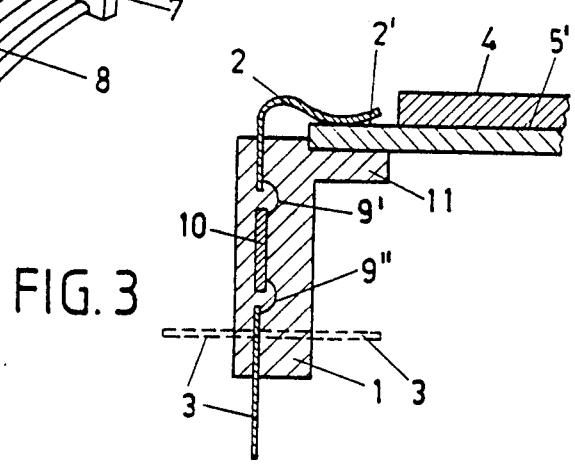
FIG. 3 shows a section of the contact arrangement according to FIG. 2 along the line A—A'.

FIG. 3 shows a section along the line A—A' of FIG. 2. Contact tabs 2 which are connected via tracks 5' to the electrode segments 5 (not shown here) are provided on the display cell 4 in contact with contact surfaces 2'. The contact tabs 2 and the contact pins 3 are connected via electric lines 9', 9" (gold or aluminium wires) to an integrated electronic circuit 10 embedded in the multi-point connector 1. The electric lines 9', 9" are likewise located within the multi-point connector 1. Since the integrated circuit is in the immediate vicinity of the counter-contact, namely the contact tabs 2, the electric lines 9', 9" are very short. The electrical losses and hence also the outlay on connections are thus substantially reduced. At the upper end of the multi-point connector 1, a projection 11 is provided opposite the contact tabs 2 with the display cell 4 resting on the projection 11 and being laterally adjusted by guides provided therein. As shown in broken lines, the contact pins can also protrude laterally from the contact arrangement.

In FIG. 4, another embodiment of the invention is shown. The contact arrangement here consists of an essentially cuboid multi-point connector 1, into which the liquid crystal display cell 4, namely a matrix display with punctiform electrode segments 5, is plugged in.

FIG. 5 is a section along the line B—B' of FIG. 4. On its upper surface, the multi-point connector 1 has a U-shaped slot with a row of spring contacts 12 (counter-contacts) on both sides. The ends of the slot are surrounded by the multi-point connector 1, so that the plugged-in display cell 4 is adjusted. The spring contacts 12 here form a regular grid. On the lower surface of the cuboid multi-point connector 1, a (narrower) U-shaped slot surrounded by the multi-point connector is likewise provided, wherein a row of contact bushes 13 (external terminals) is arranged. The integrated circuit 10 is again embedded in the multi-point connector 1 and is connected via electric lines 9', 9" located within the multi-point connector 1 to the spring contacts 12 and to the contact bushes 13. The plugs 14 which are plugged into the contact bushes 13 are in turn located on a multi-point connector. On the display cell 4, contact surfaces 2' are provided on both sides, in order to enlarge the number of contacts. The contact surfaces 2' located on the outer side of the display cell 4 are here connected via the end face to the corresponding tracks 5'.

When two integrated circuits 10 are provided in one multi-point connector 1, a cascade arrangement according to FIG. 6 is particularly suitable. The part located in the multi-point connector 1 is indicated in broken lines. In this way, the number of external connections 3 is minimised. The two integrated circuits 10 form a so-called "master-slave" relationship, in which the left-hand circuit represents the master and the right-hand circuit represents the slave. This arrangement is excellently suitable for both symbol displays and point-matrix displays. The electrical connections between the two integrated circuits 10, the counter-contacts 2 and the external terminals 3 are made without cross-overs or by means of a film which is coated on both sides with metal tracks and which is anyway required for making the contacts with the integrated circuits 10.

The conventional display cells have a standardised length. The following four standard lengths are most suitable for use with the contact arrangement according to the invention:

$$23.9 \pm {0.2 \atop 0.1} \text{ mm}, 38.0 \pm {0.4 \atop 0.2} \text{ mm}, 50.7 \pm {0.4 \atop 0.2} \text{ mm and } 69.8 \pm {0.4 \atop 0.2} \text{ mm}.$$

The smallest standard length given is, due to the conventional grid for the contact tabs 2 (FIG. 3) or spring contacts 12 (FIG. 5), still just technically feasible. The largest standard length given is limited due to the number of terminals of the integrated circuit 10. As a standard grid for the contact tabs 2 or spring contacts 12, there are the following possibilities: 2.54 mm (0.1 inch), 1.905 mm (0.075 inch), 1.27 mm (0.02 inch) and 1.00 mm. The standard grid here gives the distance between the center lines of two adjacent contact tabs 2 or spring contacts 12. For the contact tabs 2 or spring contacts 12 made as metal springs, the smallest indicated grid of 1.00 mm cannot be further reduced because of the width of the contact tabs or spring contacts.

In Table 1, examples of integrated circuits as drivers for the display cells are listed; these are particularly suitable for the contact arrangements according to the invention. The number, the manufacturer, the type designation, the number of selectable segments $Z_{seg}$, the selection type A and the number of counter-contacts $Z_{int}$ and external terminals $Z_{ext}$ are listed.

TABLE 1

| No. | Manufacturer | Type | $Z_{seg}$ | A | $Z_{int}$ | $Z_{ext}$ |
|---|---|---|---|---|---|---|
| 1 | Philips | PCE 2100 | 40 | duplex | 22 | 6 |
| 2 | Philips | PCE 2110 | 60 | duplex | 32 | 8 |
| 3 | Philips | PCE 2111 | 64 | duplex | 34 | 6 |
| 4 | Philips | PCE 2112 | 32 | parallel | 33 | 6 |
| 5 | Siemens | SM 804 | 45 | parallel | 46 | 18 |

TABLE 1-continued

| No. | Manufacturer | Type | $Z_{seg}$ | A | $Z_{int}$ | $Z_{ext}$ |
|---|---|---|---|---|---|---|
| 6 | National | MM 5452 | 32 | parallel | 33 | 7 |
| 7 | NEC | uPD 7225 | 32–128 | parallel to 1:4 multiplex | 36 | 15 |

In Table 2, the most favourable combinations of integrated circuits, length of the display cell L in mm, number of counter-contacts $Z_{int}$, grid constant of the counter-contacts $R_{int}$ in mm, segment number $Z_{seg}$ and selection type A are indicated.

TABLE 2

| No. | L | $Z_{int}$ | $R_{int}$ | $Z_{seg}$ + A |
|---|---|---|---|---|
| 1 | 23.9 | 22 | 1.00 | 40 duplex |
| 1 | 50.7 | 20 | 2.54 | 36 duplex |
| 2,3,4,6,7 | 38.0 | 32 to 36 | 1.00 | 32 parallel up to 128 at 1:4 multiplex |
| 2,3,4,6,7 | 50.7 | 32 to 36 | 1.27 | 32 parallel up to 128 at 1:4 multiplex |
| 2,3,4,6,7 | 69.8 | 32 to 36 | 1.905 | 32 parallel up to 128 at 1:4 multiplex |
| 5 | 50.7 | 46 | 1.00 | 45 parallel up to 350 at 1:10 multiplex |
| 5 | 69.8 | 46 | 1.27 | 45 parallel up to 350 at 1:10 multiplex |

In the illustrative embodiment described in FIG. 1, two integrated circuits of type PCE 2100 from Philips have been used. The display cell 4 is 51 mm long and 22 mm wide. The number of contact tabs 2 is 20 on each side, with a grid constant of 2.54 mm. The number of contact pins 3 is 6 on each side, the grid constant being 2.54 mm for each group of three. The contact pins 3 are soldered to the print plate 6, so that a very stable electrical and mechanical connection to the contact arrangements and hence also to the display cell 4 is formed. The total number of the selected electrode segments 5 is 72.

In the illustrative embodiment indicated in FIG. 2, two integrated circuits of the type PCE 2111 from Philips have been used. The large-area display cell 4 is 70 mm long and 70 mm wide. The number of the contact tabs 2 of one contact arrangement is 34, with a grid constant of 1.00 mm. The number of the contact pins 3 of each contact arrangement is 6, with a grid constant of 2.54 mm, and they are connected via the plug 7 to the flat band cable 8. The number of the selectable electrode segments 5 is 128 in this case. The display cell 4 is mounted in a frame (not drawn), in order to ensure good mechanical stability.

The manufacture of the contact arrangements, according to the invention, with multi-point connectors 1 is similar to the production of integrated circuits with plastic housings. For this purpose, the track pattern is stamped from a metal web (copper) and glued to a flexible film. When two integrated circuits 10 have been arranged in cascade, a second track pattern is stamped and glued to the other side of the film. The conventional margin around the track pattern is then stamped out and the integrated circuit or circuits 10 and, for example, the contact tabs 2 and the contact pins 3 are bonded to the tracks by means of gold or silver wires. The housing is then fitted around this structure by means of an appropriate process, such as transfer moulding, that is to say two multi-point connector halves are locally heated and the flexible film with the integrated circuit 10, the contact tabs 2 and the contact pins 3 is pressed in between the two halves.

For the contact tabs 2, the contact pins 3, the spring contacts 12 and the contact bushes 13, preferably nickel-silver, beryllium or—and this is particularly economical—brass is selected. The sheet thickness is between 0.1 and 0.3 mm, and is preferably 0.2 mm. The outer parts are provided with superficial copper-plating or tin-plating.

It is to be understood that the counter-contacts and the external terminals can be formed by any desired plug systems. The contact arrangements according to the invention are also applicable with particular advantage for a modular plug-in system.

I claim:

1. An electric contact arrangement for a liquid crystal display cell having a liquid crystal display margin, an illumination zone, electrode segments and electrode tracks extending outwardly to edge surfaces of said liquid crystal display cell, comprising
   at least one multipoint connector block provided at least at one of said edge surfaces of said liquid crystal display cell, said connector block being plugged into said edge surfaces,
   a plurality of contacts extending from said one edge surface of said liquid crystal display cell into said multipoint connector block,
   at least one integrated electronic circuit embedded in said connector block and connected to said plurality of contacts,
   a plurality of external terminals connected to said electronic circuits within said connector block and extending from said connector block,
   wherein said connector block extends along said edge surfaces for the length of the liquid crystal display margin and illumination zone, and
   wherein said electronic circuits are located in the immediate vicinity of said plurality of contacts.

2. An electric contact arrangement according to claim 3, wherein said plurality of contacts are formed by contact tabs, and wherein said connector block has a projection for aligning contact surfaces of said liquid crystal display at said edge surfaces with said plurality of contacts.

3. An electric contact arrangement according to claim 2, wherein said external terminals are provided by contact pins.

4. An electric contact arrangement according to claim 1, wherein said connector block includes a U-shaped slot extending into said connector block along said edge surface, said slot having rows of spring contacts contacting said plurality of contacts.

5. An electric contact arrangement according to claim 4, wherein said connector block includes a second U-shaped slot extending into said connector block along a surface away from said edge surface, said second U-shaped slot having contact bushes formed as said external terminals.

6. An electric contact arrangement according to claim 1, wherein said plurality of contacts and said plurality of external terminals are arranged in groups, and wherein said contacts and said external terminals in said groups form grids.

7. An electric contact arrangement according to claim 1, wherein said plurality of contacts and said plurality of external terminals are provided of a spring metal having a sheet thickness of 0.1 to 0.3 mm.

8. An electric contact arrangement according to claim 7, wherein said spring metal is selected from a group consisting of nickel-silver, beryllium, aluminium bronze, or brass.

9. An electric contact arrangement according to claim 8, wherein said spring metal is coated with a superficial coating selected from the group of copper or tin.

10. An electric contact arrangement according to claim 1, wherein a plurality of display symbols are driven by said integrated electronic circuits on said liquid crystal display cell.

11. An electric contact arrangement according to claim 1, wherein said external terminals are provided by contact pins.

* * * * *